(12) United States Patent
Kolmanovsky et al.

(10) Patent No.: US 7,673,616 B2
(45) Date of Patent: Mar. 9, 2010

(54) ENGINE CONTROL INCLUDING KNOCK COMPENSATION

(75) Inventors: Ilya Vladimir Kolmanovsky, Novi, MI (US); Steven Joseph Szwabowski, Northville, MI (US); John Ottavio Michelini, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/176,814

(22) Filed: Jul. 21, 2008

(65) Prior Publication Data
US 2010/0012088 A1    Jan. 21, 2010

(51) Int. Cl.
*F02P 5/152* (2006.01)
(52) U.S. Cl. .......................... 123/406.37; 123/406.29; 123/90.15
(58) Field of Classification Search ... 123/90.15–90.18, 123/406.29, 406.37
See application file for complete search history.

(56) References Cited

U.S. PATENT DOCUMENTS

| | | | | |
|---|---|---|---|---|
| 4,356,551 A | | 10/1982 | Iwase et al. | |
| 5,765,514 A | * | 6/1998 | Sono et al. | 123/90.11 |
| 5,797,360 A | * | 8/1998 | Pischinger et al. | 123/90.11 |
| 6,167,852 B1 | * | 1/2001 | Kamimaru et al. | 123/90.11 |
| 6,349,685 B1 | * | 2/2002 | Kolmanovsky et al. | 123/90.11 |
| 6,536,389 B1 | * | 3/2003 | Shelby et al. | 123/90.15 |
| 6,588,385 B2 | * | 7/2003 | Fuwa | 123/90.11 |
| 6,910,461 B2 | * | 6/2005 | Tanei et al. | 123/406.29 |
| 6,971,350 B2 | | 12/2005 | Akasaka et al. | |
| 7,089,895 B2 | * | 8/2006 | Naber et al. | 123/90.11 |
| 7,121,525 B2 | * | 10/2006 | Gelez | 251/129.19 |
| 2003/0230281 A1 | | 12/2003 | Hoshino | |
| 2005/0027433 A1 | * | 2/2005 | Panciroli | 701/111 |
| 2005/0165536 A1 | | 7/2005 | Fukasawa et al. | |
| 2006/0150932 A1 | * | 7/2006 | Naber et al. | 123/90.11 |
| 2006/0225700 A1 | * | 10/2006 | Ramappan et al. | 123/406.21 |
| 2007/0016387 A1 | | 1/2007 | Takemura et al. | |
| 2007/0215109 A1 | | 9/2007 | Kaneko et al. | |

* cited by examiner

*Primary Examiner*—Erick Solis
(74) *Attorney, Agent, or Firm*—Allan J. Lippa; Alleman Hall McCoy Russell & Tuttle LLP

(57) ABSTRACT

Systems and methods are described, including one example method of controlling an engine having a cylinder with at least one valve operated by a variable valve mechanism (VVM) having a sensor coupled to the valve, the method comprising: adjusting at least one operating parameter in response to an indication of detonation of a combustible mixture in the cylinder, the indication based on the sensor coupled to the valve.

20 Claims, 5 Drawing Sheets

ENGINE CONTROL INCLUDING KNOCK COMPENSATION

BACKGROUND

Internal combustion engines may be susceptible to undesired detonation, such as engine knock or pre-ignition, under various conditions. Undesired detonation may cause increased pressure build-up and heating that can degrade engine components as well as decrease engine efficiency. As such, various approaches have been used to identify and address knock, including acoustic sensors or accelerometers placed on an engine, as well as internal cylinder pressure sensors and ionization sensors.

In one particular approach, described in US 2003/0230281, a vibration sensor mounted to an engine block identifies engine knock, taking into account noise generated by valve closing events, such as the intake valve. Specifically, the control system attempts to compensate for noise in the vibration sensor caused by the closing of the intake valve in a particular window during which knock is monitored.

The inventors herein have recognized various issues with such an approach. For example, even if the system can identify the valve closing event, the noise generated by such an event still detracts from the signal quality of the vibration sensor with respect to knock detection. Additionally, when valve seating noise is too great, knock detection may not even be possible. As such, knock detection and mitigation may still be compromised.

SUMMARY

Systems and methods are provided for controlling an engine having a cylinder with at least one valve operated by a variable valve mechanism (VVM) having a position sensor coupled to the valve used to detect detonation of a combustible mixture in said cylinder. Oscillations in the position of the valve are used to detect said detonation. The decision to take one or more actions aimed at responding to and mitigating said detonation in the cylinder is due at least in part to said oscillations. The actions aimed at mitigating said detonation in subsequent cycles of the engine include changing the valve timing, changing the ignition timing, etc.

In the embodiment, an electric valve actuator (EVA) with a position sensor, an actuator controller, and a microcomputer is used to monitor and respond to engine knock. In alternate examples, valves could be controlled by pneumatic, hydrolytic or another such variable valve mechanisms. In other examples, the detonation sought to be detected and controlled may be pre-ignition instead of, or in addition to, engine knock.

One feature of the invention is that it relies upon position sensors that are associated with individual cylinders in the engine. Because of this association, the presence or absence of undesired detonation may be precisely determined in each cylinder. Precise determination is useful for isolating the location in the engine where responding mitigation may be focused. Another feature of the invention is that position data is gathered only when a measuring valve is seated. In this way, data is windowed, necessarily eliminating distortion from the vibration caused by the seating of the measuring valve. Another feature of the invention is that, in the case where a plurality of valves with variable valve mechanisms coupled to position sensors exist in a cylinder, one or more valves with the largest surface area may be exclusively used in measurement. In one example, an intake valve is used that is larger than an exhaust valve. The use of valves with larger surface areas may have a higher signal to noise ratio for indicating detonation. Still a further feature is the ability to corroborate data from more than one valve operating in an engine cylinder. Corroboration is useful to increase the accuracy and precision of the characteristics of the detonation (such as timing, frequency, intensity, etc.).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE FIGURES

Figure 1:
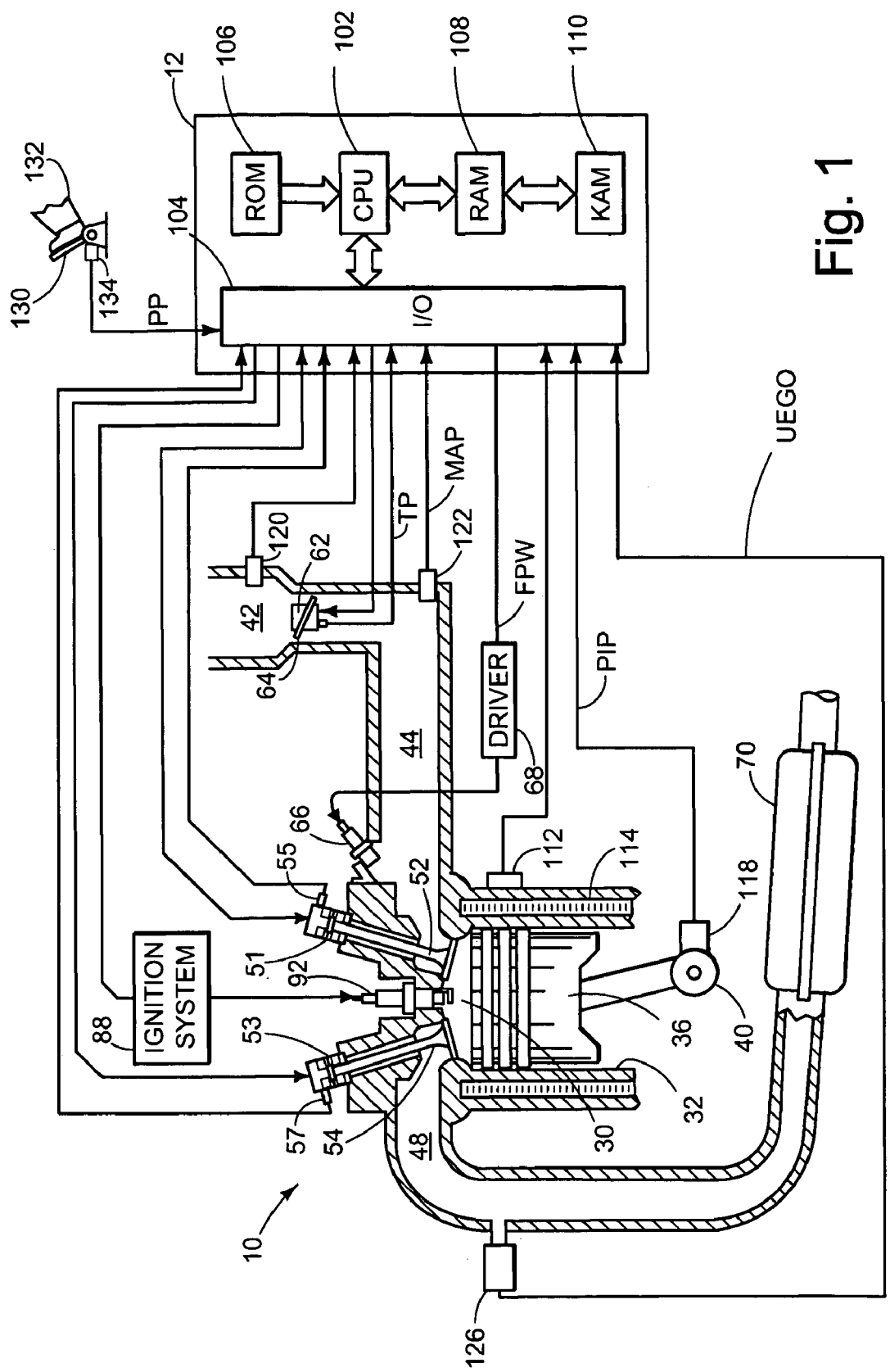
FIG. 1 is a schematic diagram of an engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively, which indicate displacement of the valve along an axis of the actuator (see FIG. 2). As another example, cylinder 30 may include an intake valve controlled via electric valve actuation and an exhaust valve controlled via cam actuation including cam profile switching (CPS) and/or variable cam timing (VCT).

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. In one example, sensor 118, which is also used as an engine speed sensor, may produce a predetermined number of equally spaced pulses every revolution of the crankshaft thereby indicating crankshaft position.

Storage medium read-only memory 106 can be programmed with computer readable data representing instructions executable by processor 102 for performing the methods or routines described below as well as other variants that are anticipated but not specifically listed.

As described above, FIG. 1 shows only one cylinder of a multi-cylinder engine, and each cylinder may similarly include its own set of intake/exhaust valves, valve position sensor(s), fuel injector, spark plug, etc.

Figure 2:
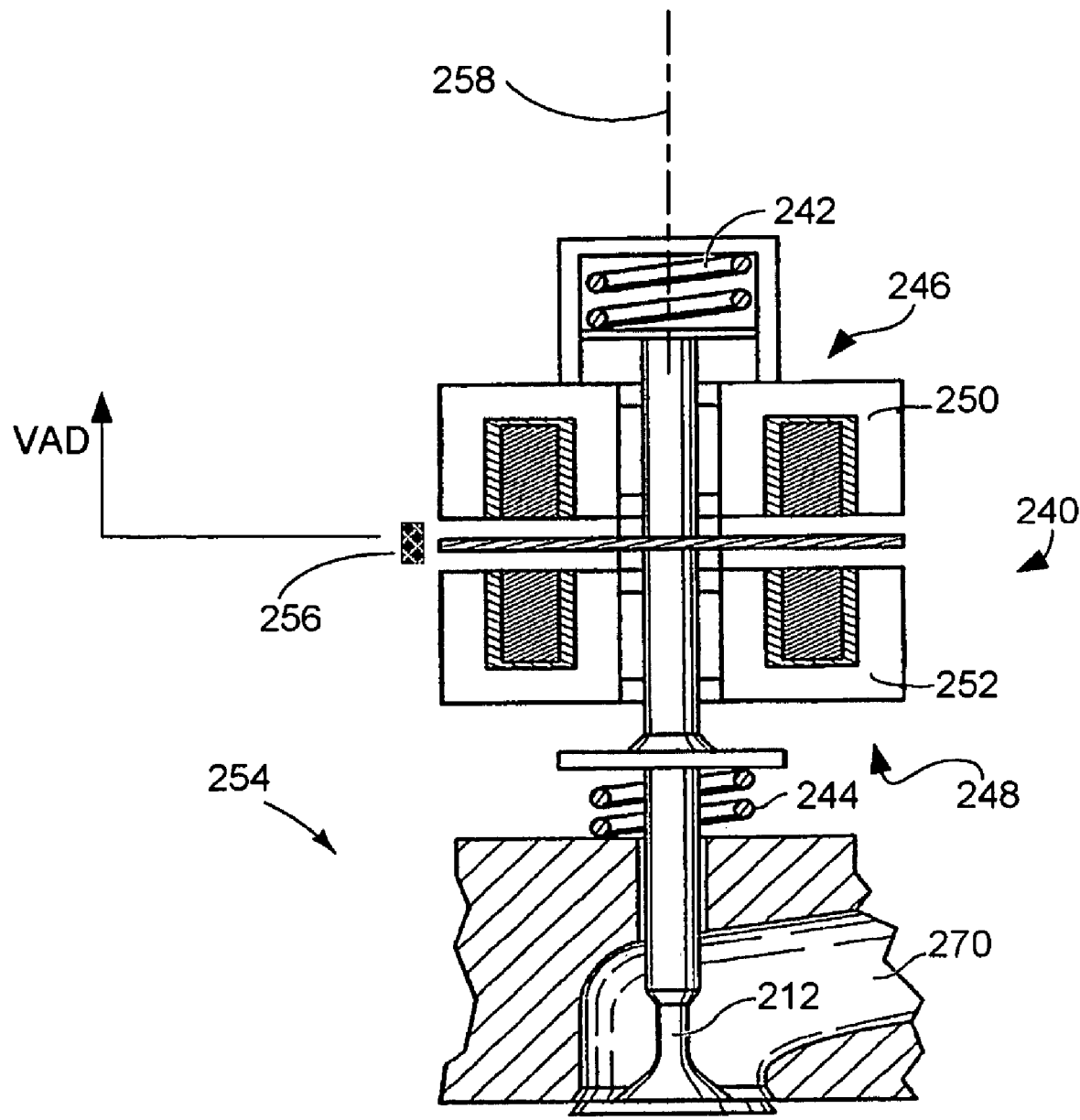
FIG. 2 is a detailed schematic of a valve and an electric valve actuator (EVA) that controls it.

FIG. 2 shows an example dual coil oscillating mass actuator assembly 240, which is one example of EVA actuator 51 and/or 53. The assembly 240 may include an engine valve 254, which may be an intake or exhaust valve. The engine valve 254 may also be referred to as a cylinder valve. The engine valve 254 is actuated by a pair of opposing electromagnets (solenoids) 250, 252, which are designed to overcome the force of a pair of opposing valve springs 242 and 244. The electromagnets may include coils (not shown). An upper actuator 246 may contain the electromagnets 250. A lower actuator 248 may contain electromagnet 252. The upper actuator may be a closing actuator and the lower actuator may be an opening actuator. FIG. 2 also shows port 270, which can be an intake or exhaust port.

Springs 244 and 242 are coupled to an armature 212. When the valve is actuated, armature 212 moves up or down along valve armature axis 258, enabling the opening or closing of the valve, respectively. A position detector 256 is located above lower actuator 248 and below upper actuator 246 and configured to detect the vertical armature displacement (VAD) of the armature 212 along valve armature axis 258. The signal VAD from the position detector 256 may be sent to a control system, one example being controller 12. In this way, the control system can identify a valve position, and determine whether the valve 241 is stationary, opening, closing, etc. It will be appreciated that in alternate embodiments, position detector 256 may be located at another location along valve armature 212, such as above spring 244 and below spring 242 or housed inside oscillating mass actuator assembly 240.

Applying a variable voltage to the electromagnet's coil induces current to flow, which controls the force produced by each electromagnet. Due to the design illustrated, each electromagnet that makes up an actuator produces force in one direction, independent of the polarity of the current in its coil. High performance control and efficient generation of the required variable voltage can therefore be achieved by using a switch-mode power electronic converter. Alternatively, electromagnets with permanent magnets may be used that can be attracted or repelled. Further still, other electrically actuated valve systems may be used.

As illustrated above, the electromechanically actuated valves in the engine may remain in a half, or partially, open neutral position when the actuators are de-energized. Therefore, prior to engine combustion operation, each valve goes through an initialization cycle. During the initialization period, the actuators are pulsed with current, in a prescribed manner, in order to establish the valves in the fully closed or fully open position. Following this initialization, the valves are sequentially actuated according to the desired valve timing (and firing order) by the pair of electromagnets, one for pulling the valve open (lower) and the other for pulling the valve closed (upper). While FIG. 2 shows the valves to be permanently attached to the actuators, in practice there can be a gap to accommodate actuator and valve thermal expansion.

The magnetic properties of each electromagnet are such that only a single electromagnet (upper or lower) need be energized at any time. Since the upper electromagnets hold the valves closed for the majority of each engine cycle, they are operated for a higher percentage of time than that of the lower (opening) electromagnets. However, in an alternative example, single coil valve actuators may be used. It will be appreciated that in further alternative examples the opening and closing of valves may be carried out pneumatically or hydrolytically, instead of electromagnetically.

After current flows through the upper actuator for a duration of time, the cylinder valve will not persist in moving but come to rest against a mounting located at the opening between port 270 and the engine cylinder 30 referred to as a valve seat (not shown), sealing the passageway between the port and the engine cylinder. Such a valve position may be referred to as seated. It will be appreciated that the valve may partially seal the opening to the cylinder when seated. In one example, partial valve seating may be controlled by supplying current to the upper and lower actuators.

When the valve is seated, the position sensor 256 may continue sense displacement or motion (e.g., VAD) of the valve, including vibrational displacement which occurs without substantially unseating the valve. In this way, the position sensor indicates and measures valve position. The valve displacement in the seated position may be affected by the state of the engine cylinder, including the pressure in the cylinder. In this way, information about the build-up and time variation of pressure inside the chamber may be conveyed via the displacement VAD. The displacement VAD may be particularly correlated with cylinder pressure conditions during selected conditions, such as when all cylinder valves in a given engine cylinder are seated.

In one particular example, the displacement VAD may be correlated to detonation conditions, such as engine knock. As described previously herein, detonation of a combustible mixture is a process characterized by sudden and intense build-up of pressure in the engine cylinder beyond a specified amount. It may be appreciated that because detonation produces characteristic conditions, the signal from the position sensor produced by such a state may have an identifiable signature that can be recognized when compared with non-detonating combustion. The process of detecting and responding to the detonation is further described in FIGS. 3 and 4A-4C.

Figure 3:
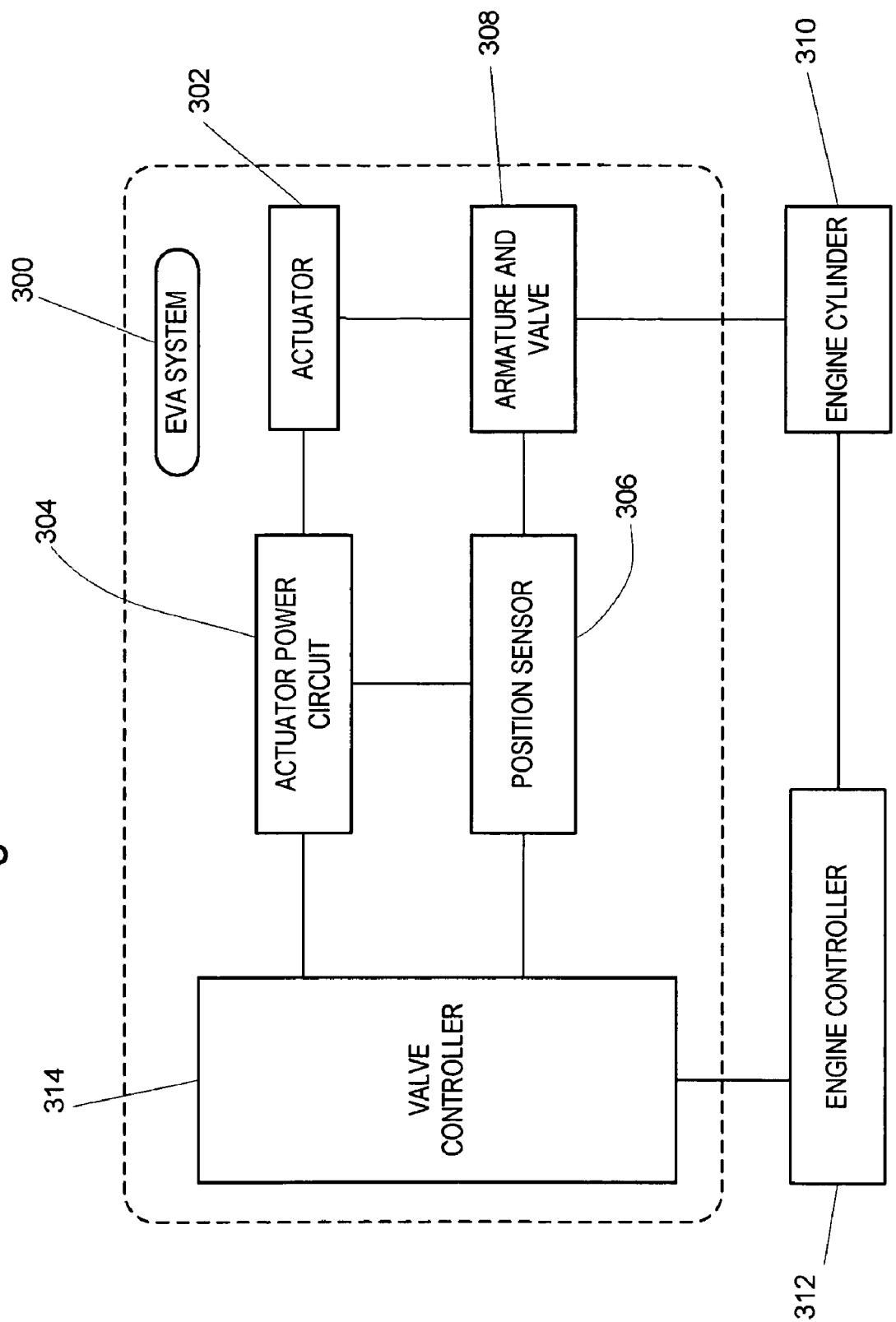
FIG. 3 is a block diagram of the components in the engine and specifically an electric valve actuator that relates to the detection of knock.

FIG. 3 is a block diagram illustrating interactions between an electric valve actuator system 300, an engine cylinder 310, and an engine controller 312. System 300 is further comprised of a valve controller 314, an actuator 302, an electric circuit 304 for powering the actuator, a valve and armature system 308 coupled to the actuator, and a sensor 306 coupled to the valve and armature. The sensor 306 measures and indicates the vertical displacement of the armature (i.e. valve position). The engine controller 312 may be used to control engine systems and operating parameters and is one example of microcomputer 12. Engine cylinder 310 is one example of engine combustion chamber 30 and is used in the controlled ignition of fuel. It may include a piston, valves—one example of which may be included in valve armature system 308—and a spark plug, such as described with regard to FIG. 1.

Valve and armature system 308 may include a cylinder valve; for example, an intake or an exhaust valve, valve springs, a valve seat, and an armature that is driven by the actuator 302, such as described with regard to FIG. 2. The valve controller 314, among other functions, may perform feedback control of the valve and armature system. Utilizing feedback control allows for accurate control of the valves under a variety of engine operating conditions. The controller may send a signal to the electronic circuit 304 which powers actuator 302. The actuator may drive the armature and valve system. Sensor 306 is coupled to the armature and may communicate with the valve controller about the state of the valve.

As described above, the valve and armature system 308 may be affected by detonation of a combustible mixture in the engine cylinder 310, and as such the valve position signal VAD may be processed by the control system to identify detonation of a combustible mixture, such as engine knock.

However, the dynamic response of valve displacement to detonation of a combustible mixture may be affected by various parameters, including the structural components of the valve system and valve seat, as well characteristics of the combustion event. As an example, the reactive force of the valve seating, valve springs, and actuator may affect the valve position signal profile during a combustion event. As such, the valve displacement detonation response may be affected by the spring constant of the valve spring. As another example, the response may be affected by a pressure profile of the combustion in the engine cylinder, which can be affected by air to fuel ratio, temperature, spark timing, etc.

The position signal generated by the position sensor 306 is responsive to the movement of the valve, and is received by valve controller 314. The valve may be seated when the position signal is generated, giving a measurement of position. Alternatively, the position signal may be received by engine controller 312.

Valve controller 314 may include various filters and windows for processing the valve position VAD. The filtering may include various band-pass filters to pass frequencies near a resonant frequency of the valve system in the seated condition. The windowing may include passing signal content from selected crank angles, such as crank angle windows corresponding to conditions when one or more valves in the cylinder is (are) seated. The window may also be adjusted based on an expected knock window commencing before ignition timing. Additional details are described herein with regard to FIGS. 4A-4C.

Based on the windowed and filtered valve position, the control system may make a determination about whether the signal is indicative of knock. This may be done by comparing the signal to a predetermined signal representative of an engine cylinder without knock under similar conditions. The comparison may include time-frequency analysis, or the amplitude of a plurality of selected frequencies may be compared. In this way information from the position sensor may enable the detection of engine knock. While the above example is described with regard to signal processing in controller 314, such an operation may be carried out by controller 312 in an alternative embodiment.

Once engine knock is identified, the controller may enter an operating condition when adjustments to operating parameters may be made by the control system. For example, the engine controller may adjust one or more of the engine systems, such as ignition, fuel injections, throttle angle, engine cooling, valve timing, etc. These in turn may affect the combustion of fuel in the cylinder 312 to mitigate detonation. In this way, the components interact to detect and respond to detonation, such as knock.

Figure 4A:
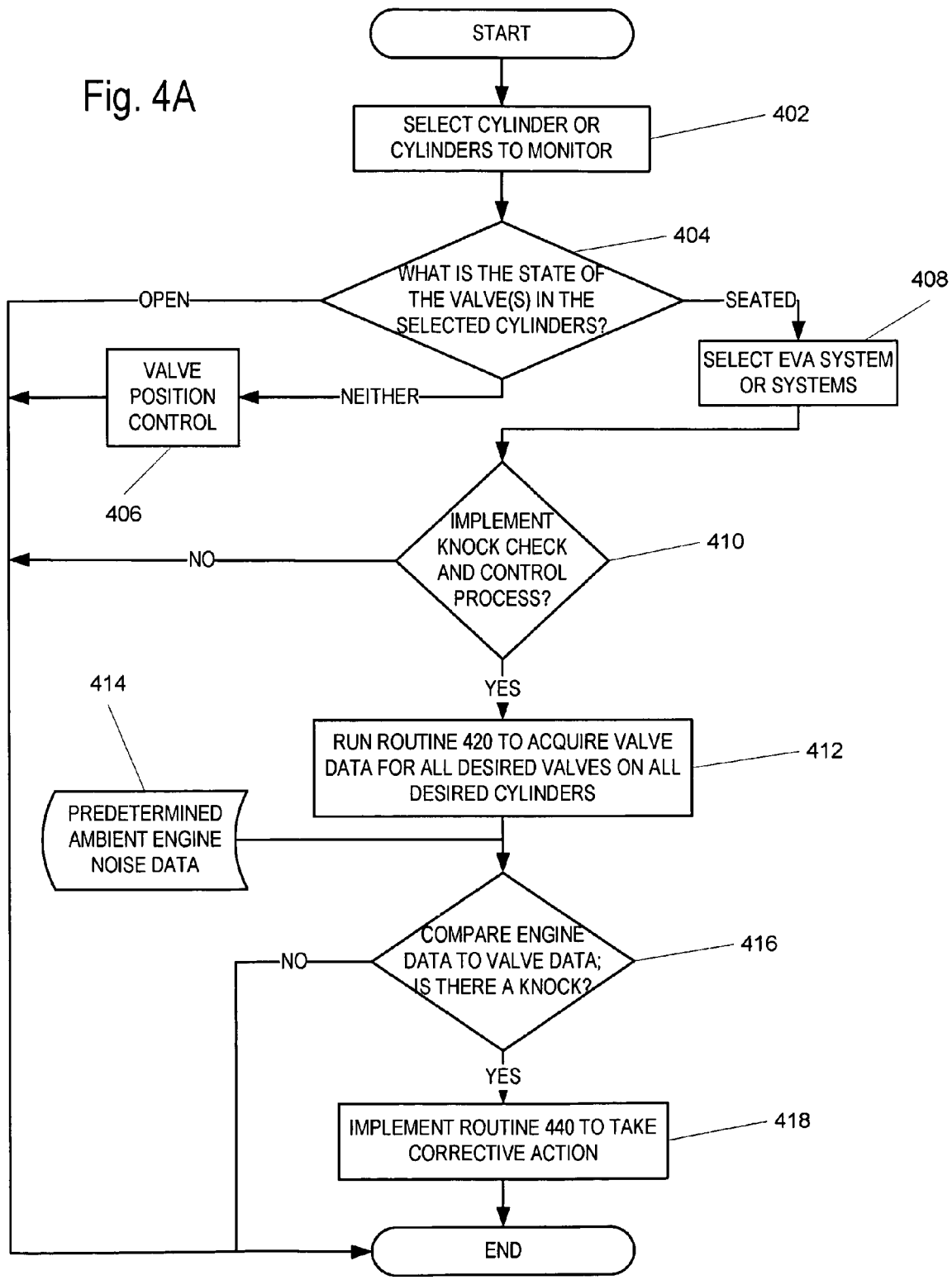
FIG. 4 is a flow chart of the process by which engine knock is detected and determined and control schemes implemented as a result of this determination.
Figure 4B:
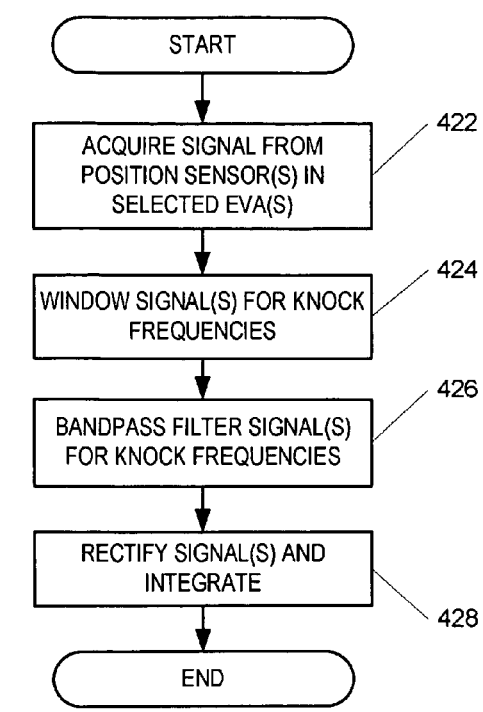
Figure 4C:
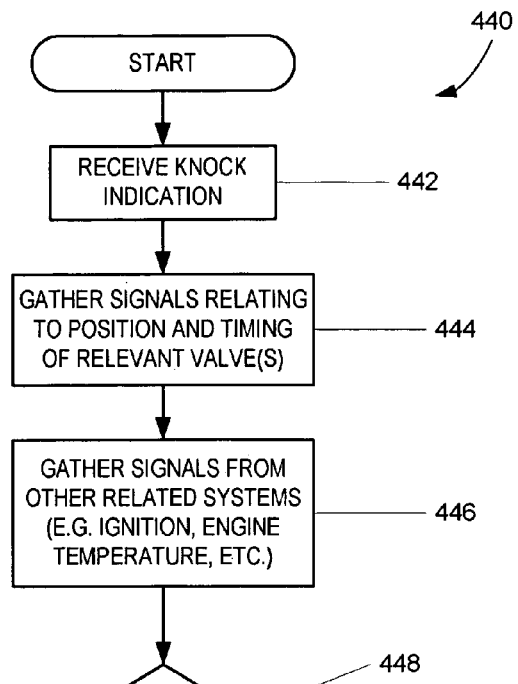
Figure 4C:
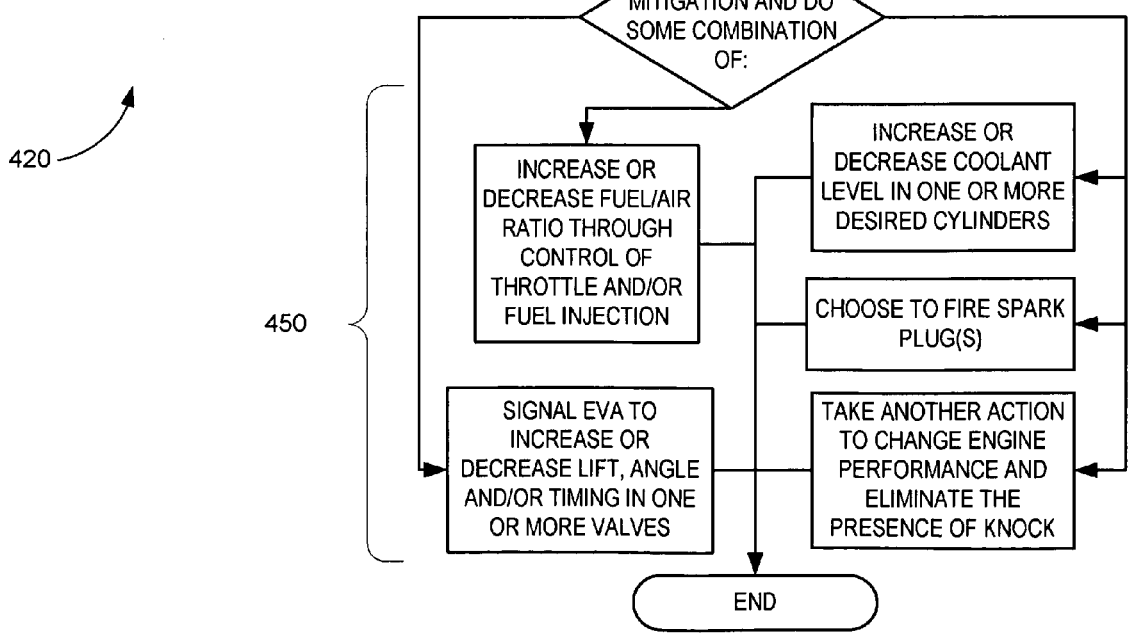

FIGS. 4A-4C are an embodiment of a control routine that employs position sensors in one or more cylinder valves to identify and respond to engine knock. The control routine may be carried out in one or more control systems, an example of which includes controllers 312 and 314.

At 402, the routine selects one or more of the engine's cylinders for monitoring. The selection of cylinders may be based on operating parameters, such as cylinder temperature, engine coolant temperature, engine speed, throttle position, exhaust temperature, and duration from previous knock sensing in the selected cylinder. In one example, the routine monitors each engine cylinder including an electrically actuated valve. In another example, the routine monitors a sub-set of engine cylinder, such as a single engine cylinder having an electrically actuated valve, and assigns the conditions of the monitored cylinder to other engine cylinders.

Next, at 404, the routine determines the state of valve(s) in the selected cylinder. In one example, the routine may determine, for each valve in the cylinder, whether the valve is seated, open, or moving based on position/displacement of the valve as indicated by a sensor, an example of which is sensor 256. In this way, the state of the valves is determined by a measurement of the valve position.

If none of the valves are seated, the routine continues to 406 and carries out position control of the valves based on feedback from the valve position sensors. If at least one of the valves is seated, then at 408 the routine selects which of the seated valve positions to monitor to identify knock in the selected cylinder. When a plurality of valves are seated, the routine may select the valve with the largest surface area, for example an intake valve that is larger than an exhaust valve, since it may have a higher signal to noise ratio for indicating engine knock. In another example, the routine may select all seated valves, and combine the position signal data from each valve to better identify knock in the selected cylinder. In this way position signal data may be more accurate and precise in characterizing the detonation by using information from a plurality of valve position sensors of a plurality of valves seated in the cylinder.

Further, the routine may select among different seated valves (or different valve groups) for monitoring depending on operation conditions. Thus, during a first operating condition (such as during low loads), the routine may monitor a seated intake valve position for indications of engine knock. However, during high loads, the routine may monitor a seated exhaust valve position to identify engine knock. Still further, during high speed conditions, the routine may monitor both seated intake and exhaust valve positions to identify engine knock. In this way, the routine may improve accuracy in knock detection across a range of operating conditions by appropriate selection of valve position data.

Returning to FIG. 4, the controller continues to 410 to determine if the knock monitoring and control process is to be implemented. If not, the routine continues to the end. Otherwise, the routine continues to 412. At 412, the routine carries out the routine 420 of FIG. 4B to acquire and filter position data from the selected valves.

Next, predetermined ambient engine noise data 414 is compared to the filtered valve signal at 416. In one example, the routine determines whether engine knock is present in one or more of the selected cylinders. If engine knock is identified, the routine continues to 418 to take mitigating action, by adjusting one or more operating parameters, such as valve opening and closing timing and/or retarding ignition timing, further details of which are described with regard to routine 440 of FIG. 4C. Otherwise, the routine ends.

While the above embodiment was directed toward identifying and compensating for engine knock, in an alternative example the routine may identify and compensate for pre-ignition.

Referring now to FIG. 4B, a routine is described for windowing and filtering valve position sensor data. First, at 422, the routine acquires measurements of the valve position(s) from the position sensor signal(s). Then, at 424, the routine windows the signal data. In one example of intake valve sensor data, the window starts at intake valve closing timing and ends at exhaust valve opening timing. Then, at 426, the routine band-pass filters the position signal at frequencies characteristics of engine knock. Next, at 428, the routine rectifies and integrates the position sensor signal data.

Referring now to routine 440 of FIG. 4C, at 422 the routine begins with an indication of knock in one or more of the selected valves. In this way, the routine identifies that there has been a detonation of a combustible mixture. At 444, the routine gathers information about the position and timing of valves in the engine. Additionally, at 446 the controller determines the condition of the other engine systems, such as the ignition timing, engine temperature, etc.

Once information is gathered, the controller selects a course of action at 448 to mitigate the detected knock. The controller carries out these actions at 450 aimed at addressing the knock. A controller selecting and carrying out a course of action may be referred to as under operating condition. The actions may include operating parameter adjustments, such as changing the lift, angle or timing of one or more cylinder intake and/or exhaust valves, increasing or decreasing the air to fuel ratio, and/or retarding ignition timing.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the control system.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling an engine having a cylinder with at least one valve operated by a variable valve mechanism (VVM) having a sensor coupled to the at least one valve, the method comprising:
   adjusting at least one operating parameter in response to an indication of detonation of a combustible mixture in the cylinder, the indication based on the sensor coupled to the at least one valve, wherein the sensor is a position sensor of the at least one valve, and where the indication of detonation is based on a measurement of a position of the at least one valve from the sensor while the at least one valve is seated.

2. The method of claim 1, wherein said VVM is an electric valve actuator (EVA).

3. The method of claim 1 wherein said adjusting includes retarding ignition timing in the cylinder during a subsequent cycle of the cylinder.

4. The method of claim 1 wherein said adjusting includes adjusting valve opening and/or closing timing of the at least one valve during a subsequent cycle of the cylinder.

5. The method of claim 1 wherein the measurement of the position of the at least one valve for indicating engine knock commences after intake valve closing and ends before exhaust valve opening of the cylinder.

6. The method of claim 1 wherein said adjusting includes controlling valve opening or closing timing of the at least one valve.

7. The method of claim 1 wherein the indication of detonation is based on valve positions of at least two valves in the cylinder while both valves are seated.

8. A method of controlling an engine having a cylinder with at least a first electrically actuated valve and a second electrically actuated valve, each of the at least a first electrically actuated valve and a second electrically actuated valve having a position sensor coupled thereto, the method comprising:
during a first operating condition, adjusting at least one operating parameter in response to an indication of detonation of a combustible mixture in the cylinder, the indication based on at least the position sensor coupled to the first electrically actuated valve; and
during a second operating condition, different from the first operating condition, adjusting said at least one operating parameter in response to an indication of detonation of the combustible mixture in the cylinder, the indication based on at least the position sensor coupled to the second electrically actuated valve.

9. The method of claim 8 where the first electrically actuated valve is an intake valve, and the second electrically actuated valve is an exhaust valve.

10. The method of claim 8 where the first electrically actuated valve is a first intake valve, and the second electrically actuated valve is a second intake valve of the cylinder.

11. The method of claim 8 further comprising, during a third operating condition, different from the first operating condition and the second operating condition, adjusting said at least one operating parameter in response to an indication of detonation of the combustible mixture in the cylinder, the indication based on the position sensor coupled to the first electrically actuated valve and the position sensor coupled to the second electrically actuated valve.

12. A system for a cylinder of an engine, the cylinder having a valve seat, comprising:
a cylinder valve coupled to the cylinder and configured to close in the seat;
an electrically powered actuator coupled to the cylinder valve and configured to seat the valve;
a position sensor configured to indicate valve position, the sensor generating signal data even while the valve is seated; and
a control system for adjusting at least one operating parameter in response to an indication of knock in the cylinder, the indication based on the sensor signal while the valve is seated.

13. The system of claim 12 wherein the position sensor is responsive to movement of the valve in an opening and closing direction.

14. The system of claim 13 further comprising a spark plug coupled in the cylinder, wherein the control system retards ignition timing in response to the indication of engine knock.

15. The system of claim 14 wherein the indication is based on the sensor signal generated after intake valve closing and before exhaust valve opening, where the cylinder valve is an intake valve.

16. The system of claim 12 wherein the control system adjusts the electrically powered actuator to control valve position based on the sensor signal while the valve is not seated.

17. A method for controlling an engine, comprising:
adjusting spark timing of the engine in response to a position of a first valve of a cylinder of the engine and in response to a position of a second valve of a cylinder of the engine, the first valve in a closed position and the second valve in a closed position.

18. The method of claim 17 wherein the adjusting includes retarding spark.

19. The method of claim 17 wherein the first valve and the second valve are electrically actuated valves.

20. The method of claim 17 wherein the position of the first valve and the position of the second valve are related to a first position sensor and a second position sensor respectively.

* * * * *